United States Patent [19]

Lazzari, deceased et al.

[11] 3,909,054

[45] Sept. 30, 1975

[54] WEED PULLER

[76] Inventors: Gilbert A. Lazzari, deceased, late of Redwood City, Calif., by Mary L. Lazzari, administratrix, 340 Arlington Rd., Redwood City, Calif. 94062

[22] Filed: Nov. 26, 1973

[21] Appl. No.: 419,080

[52] U.S. Cl. ................................ 294/50.9; 294/104
[51] Int. Cl.² ............................................ A01B 1/18
[58] Field of Search ....... 294/50.5, 50.6, 50.8, 50.9, 294/103, 104; 172/378, 720; 254/132; 269/228, 201

[56] References Cited
UNITED STATES PATENTS

| 1,097,827 | 5/1914 | Tsuboi | 294/50.9 |
|---|---|---|---|
| 1,745,292 | 1/1930 | Buser | 294/50.9 |
| 1,952,605 | 3/1934 | Pearson | 269/228 |
| 2,033,431 | 3/1936 | Krauter | 294/50.9 |
| 2,327,368 | 8/1943 | Olson | 269/228 X |
| 2,436,500 | 2/1948 | Anderson | 294/50.8 |
| 2,923,508 | 2/1960 | Daugherty | 269/228 UX |
| 3,272,548 | 9/1966 | Taylor | 294/50.9 |
| 3,369,834 | 2/1968 | Miles | 294/50.9 |

Primary Examiner—Richard A. Schacher
Assistant Examiner—Johnny D. Cherry

[57] ABSTRACT

A pair of ground-piercing prongs of which one is fixedly connected to the base of a handle and the other of which is pivotally mounted thereon, and a lever fulcrumed on the handle and pivotally connected to the pivot linkage associated with the pivotally mounted prong to bring the prongs together about the root of a weed.

4 Claims, 4 Drawing Figures

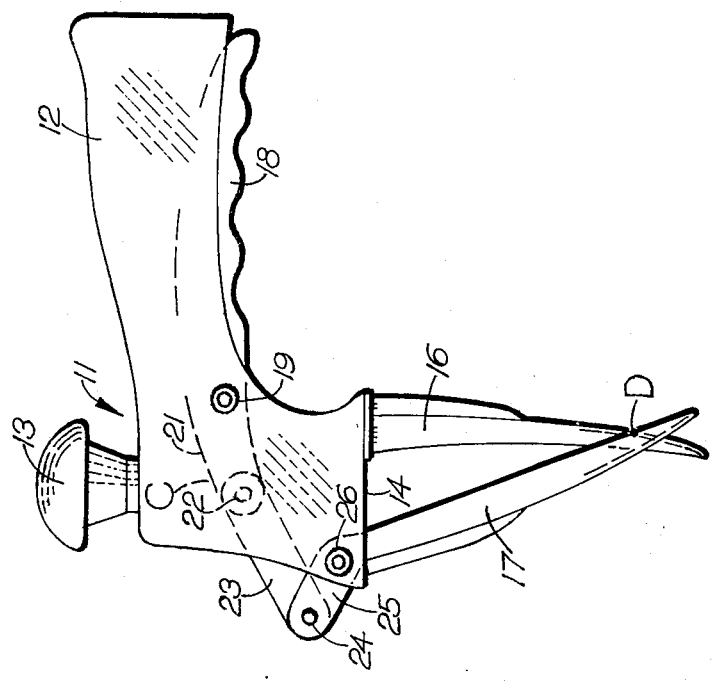
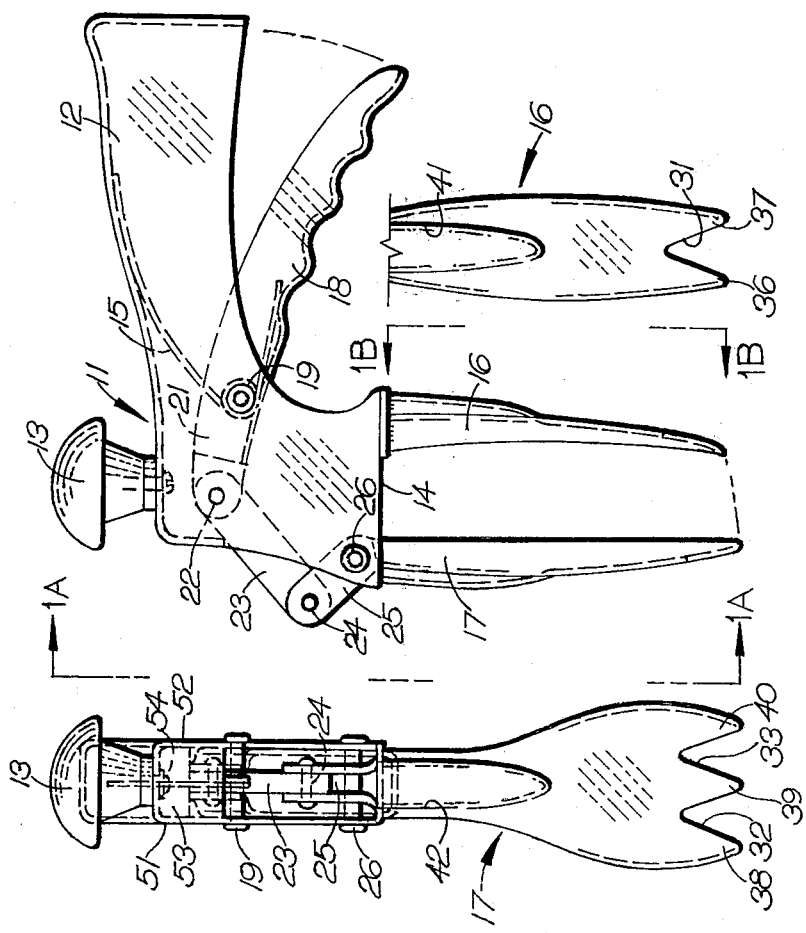

WEED PULLER

Many attempts have been made heretofore to provide a suitable device for extracting weeds from the soil. As early as January, 1890, a patent was granted to D. Earl, U.S. Pat. No. 553,485 which disclosed a weed pulling device comprising a pair of blades held apart by a tension spring and brought together by the actuation of a trigger F which compresses the spring H. This is not applicant's device and the force applied to close the blades is relatively small since the trigger F obviously is finger-tripped to compress the small spring. Another weeder is disclosed in the patent to Leaman, U.S. Pat. No. 1,244,344, entitled Lawn Weeder, issued Oct. 23, 1917, which comprises a device of complex construction including a stationary blade 26 on the lower end of a rod 15, as well as a movable blade 27 held in spaced relation to the stationary blade by the tension spring 34 coiled about an auxiliary rod 20 and bearing upon the arms 23 of the movable blade 27; the spring 34 being off-set from the axis of such movable blade. The spring is caused to be compressed, to swing the blade 27 towards the stationary blade 26, by pulling a slidably mounted cross-bar upwardly against the tension of the spring 34. This Leaman device also includes foot-rests upon which the foot may press in forcing the blades 26 and 27 into the ground. Again, this is not applicant's simple but effective weed puller. Another weeding tool of complex construction is disclosed in the Taylor patent, U.S. Pat. No. 3,272,548 issued Sept. 13, 1966, which comprises a hollow tubular handle 12 in which a movable rod 24 is mounted between a trigger 18 and a lever 28; the lever 28 being pivotally connected not only to rod 24 but also to one jaw of two movable jaws 30 and 32. A spring 38 connects the lever 28 to jaw 30 which returns the jaw to a closed position when the trigger 18 is released. A plate 42 secured to the lower extremity of handle 12 supports the jaws 30 and 32 but it is not apparent how the jaws 30 and 32 can be moved if supported on a fixed plate 42. The complex structures of the Leaman and Taylor prior patents mitigate against their marketing and use, while the weed puller of the Earl patent is absent the necessary force to be workable or effective, and the apparent inoperativeness of the Taylor device mitigates against its availability as prior art. The present invention is directed to the provision of a durable, easy handling weed puller having the capability of developing and exercising immense force for lifting weeds from the soil.

A primary object of my present invention is to provide an improved weed puller so constructed as to generate increased force upon the actuation of the trigger thereof to readily force the blades thereof into the soil and lift the weed with facility therefrom.

Another important object of the invention is to provide an improved weed puller of the indicated nature which is especially characterized by the compounding of forces to provide a straight-line drive and pull upon a weed to be extracted from the soil.

A still further object of my invention is to provide a weed puller of the aforementioned character wherein the activating trigger is so fulcrumed and the compound linkage so arranged that all of the components are moved with the utmost ease by a person of but little strength yet enabling the generation of sufficient effective force to render the pulling of every type of weed a relatively easy task.

Other objects of the invention, together with some of the advantageous features thereof, will appear from an embodiment thereof which is illustrated in the accompanying drawing and which is an exemplification of the best mode of constructing the invention and manner of using the same. The invention, of course, can be embodied in a plurality and variety of forms to embrace the concept.

Referring to the drawings:

FIG. 1 is a side elevational view of an embodiment of the invention, partly broken away at the body portion to illustrate the fulcrumed trigger and compound linkage, with the prongs in normal open positions.

FIG. 1A is a sectional elevational view taken on the line 1A—1A of FIG. 1.

FIG. 1B is an elevational view taken on the lines 1B—1B of FIG. 1.

FIG. 2 is a side elevational view of the embodiment of FIG. 1 but with the prongs closed to pull up a weed, this view illustrating by dash lines the compound linkage and straight line drive of forces upon actuation of the trigger.

As particularly illustrated in FIG. 1 the weed puller of my present invention includes a compact hollow body which is generally designated by the reference numeral 11 and which is extended at one end thereof to form a handle 12 and extended at the top to provide a knob 13 for purposes of applying added force to move the body and its components downwardly whenever hard ground is encountered. On the bottom 14 of the body 11, I fixedly secure a blade or prong 16 which is utilized in association with a movable blade or prong 17 mounted as hereinafter described.

In accordance with the invention, I provide on the body 11 a movable trigger 18 which is fulcrumed on a pin or bolt 19 spanning opposite sides of body 11 and in close proximity to the handle 12. The trigger 18 is so extended the length and below the handle 12 as to be readily grasped and released from the fingers of the hand, as clearly shown in FIG. 1 of the annexed drawings. Squeezing of the trigger 18 against the restraint of spring 15 by drawing the same toward the handle 12 actuates compound linkage mechanism of which a first link 21 is pivotally mounted on bolt 19 at one end thereof and is pivotally connected at its other end by means of a pin 22 which serves as a pivotal mounting for a second link 23 at its one end; such link 23 being pivotally connected at its opposite end to a pivot pin 24 which, in turn serves as a pivotal mount for a third link 25 connected at its opposite end by means of a bolt 26 spanning the opposite sides of body 11 and to which the movable blade or prong 17 is connected for swinging toward and away from the fixed blade The compound linkage mechanism is sometimes termed toggle joints wherein links are pivotally connected together at their inner ends and pivotally connected at their outer ends to other parts or links. The compound linkage mechanism also is sometimes referred to as rock crusher mechanism which effects multiplication of a manual force. 16. Release of the trigger 18 causes the linkage 21, 23 and 25 to return to the initial positions thereof as shown in FIG. 1 with the two blades 16 and 17 in spaced apart relationship and the trigger 18 spaced from handle 12. A second and successive pulling or drawing of the trigger 18 toward handle 12 about its fulcrum 19 causes the linkage 21, 23 and 25 to assume the positions illustrated in FIG. 2 of the annexed drawings with the prongs 16 and 17 drawn together or lapping at their extremities as shown at the bottom of this view to grasp a weed to be extracted.

It is to be especially noted that in the weed pulling operation illustrated in FIG. 2 that the pivot pin 22 on which the link 21 is pivotally mounted assumes a position indicated at C is substantially in a straight line with the crossed or lapped outer extremities of the blades or prongs 16 and 17, indicated at D in FIG. 2. The compound linkage 21, 23 and 25, accordingly exerts a straight-line force to effect tight gripping of the roots of the weeds at point D and the extracted weed can readily be pulled out of the ground by pulling up on the handle 12 of body 11. Upon releasing the finger grasp on the trigger 18, the extracted weed is dropped from the prongs 16 and 17 as they are drawn apart by the compound linkage consisting of the pivotally arranged links 21, 23 and 25, all actuated by pivoting the trigger on its fulcrum 19.

As shown in FIGS. 1A and 1B, the outer extremities of the prongs 16 and 17 can be notched, as at 31 in prong 16 and as at 32 and 33 in prong 17 to facilitate movement into the soil in the action of removing a weed from the ground; it being understood that the notches 32 and 33 can be enlarged to three in prong 17 and two notches can be provided in blade 16, as desired. The notch 31 of prong 16 affords two teeth 36 and 37 while the notches 32 and 33 provide three teeth 38, 39 and 40 in prong 17. Preferably, the two prongs 16 and 17 are formed to a slight concave shape longitudinally and are cut-away, as at 41 and 42, respectively, to lend resiliency thereto for a more effective soil-piercing and weed grasping action.

While the body 11 of my weed puller can be fabricated, from wood, if desired, it is equally fabricated of stamped or cast metal sheets, such as the sheets forming the sides 51 and 52, see FIG. 1A which are each extended at one end for fashioning of handle 12 and held in spaced relationship to one another by the bolt 19 and pin 26. Suitable openings are fashioned in the sides 51 and 52 for enabling the movement of the trigger 18 toward and away from the handle 12. A small u-frame 53 is welded or otherwise secured to the insides of the side plates 51 and 52 to span the same and to serve as a mount for the knob 13 to which it may be fixedly attached by means of the rivet 54. Of course, the compound linkage consisting of the links 21, 23 and 25 are assembled and mounted by means of the openings at opposite ends thereof upon the fulcrum 19 and pin or bolt 26 prior to insertion of u-frame 53 and riveting of the knob 13 in position and attachment of the prong 16 in fixed or stationary position on the bottom 14 of body 11 and the mounting of the movable prong 17 on the pivot pin 26. Any other manner of mounting of the components in operative positions can be employed, as desired.

It is understood that the appended claims are intended to cover not only the embodiment shown but variations thereof within the scope of the hereinabove stated and described invention.

I claim:

1. A weed puller comprising a body consisting of a pair of side plates arranged in spaced relationship to one another and defining an elongated chamber, an elongated extension on each of said pair of said plates to define a handle for carrying and lifting said body, a first bolt spanning said side plates and secured thereto, a trigger lever fulcrumed on said first bolt, a second bolt extending transversely of said chamber parallel to said first bolt and arranged in spaced relation to said first bolt, a third bolt extending transversely of said chamber parallel to said second bolt and arranged in spaced relation to said first bolt and said second bolt, compound linkage comprising a series of toggle joints consisting of at least two links connected and between said first bolt and said second bolt and to an between said second bolt and said third bolt, a rigid first prong fixedly secured to said body, and a second prong secured to said third bolt and movable by the movement of the link connected to said third bolt; said first and second prongs being weed engageable while in the soil upon movement of said second prong toward said rigid first prong to break up the soil and to tightly grip a weed therebetween for lifting the same from the soil in response to movement of said trigger lever by manual force applied thereto to actuate said compound linkage progressively increasing the force applied to said trigger lever.

2. A weed puller as set forth in claim 1, and means for effecting the return of said trigger lever to its initial position upon.

3. A week puller as set forth in claim 2 wherein said means comprises a spring coiled about said first bolt and having a first portion thereof engaging the inside of said handle and a second portion engaging said trigger lever to normally hold said trigger lever in spaced apart relation to said handle.

4. A weed puller as set forth in claim 1 wherein said compound linkage develops a straight line force upon actuation of said trigger lever to exert an increased gripping action about a weed by said first prong and said second prong.

* * * * *